(12) United States Patent
Ishikawa

(10) Patent No.: US 12,527,643 B2
(45) Date of Patent: Jan. 20, 2026

(54) SURGICAL INSTRUMENT HOLDING DEVICE AND SURGICAL ASSISTANCE DEVICE

(71) Applicant: RIVERFIELD Inc., Tokyo (JP)

(72) Inventor: Yoshihiro Ishikawa, Tokyo (JP)

(73) Assignee: RIVERFIELD INC., Tokyo (JP)

( * ) Notice: Subject to any disclaimer, the term of this patent is extended or adjusted under 35 U.S.C. 154(b) by 493 days.

(21) Appl. No.: 17/993,547

(22) Filed: Nov. 23, 2022

(65) Prior Publication Data
US 2023/0080541 A1    Mar. 16, 2023

Related U.S. Application Data

(63) Continuation of application No. PCT/JP2020/020677, filed on May 26, 2020.

(51) Int. Cl.
*A61B 90/50* (2016.01)

(52) U.S. Cl.
CPC ........ *A61B 90/50* (2016.02); *A61B 2090/506* (2016.02)

(58) Field of Classification Search
CPC ..... H02G 11/00; B25J 9/1065; B25J 19/0029; B25J 19/0025; A61B 2090/506
See application file for complete search history.

(56) References Cited

U.S. PATENT DOCUMENTS 4,975,016 A * 12/1990 Pellenc .................. A01D 46/30
414/730

5,375,480 A * 12/1994 Nihei ................... B25J 19/0029
901/50

6,250,174 B1     6/2001 Terada et al.
(Continued)

FOREIGN PATENT DOCUMENTS

JP           04-235517 A       8/1992
JP           10-175188 A       6/1998
(Continued)

OTHER PUBLICATIONS

Pask Makes, "Making an Articulated Desk Lamp—Scrapwood Challenge ep31", May 21, 2019, Retrieved from the Internet: URL:https://www.youtube.com/watch?v=GFRnDjok3yw.
(Continued)

*Primary Examiner* — Gregory Robert Weber
(74) *Attorney, Agent, or Firm* — Sughrue Mion, PLLC

(57) ABSTRACT

A surgical instrument holding device includes first and second parallel links, a wiring member and a connector. The first parallel link has two first link portions arranged in parallel with each other, each having one end in an axial direction as a first end portion. The second parallel link has two second link portions arranged in parallel with each other, each having one end in an axial direction as a second end portion. The wiring member is disposed along the parallel links. The connector has two first link supporters by which the respective first end portions are rotatably supported, two second link supporters by which the respective second end portions are rotatably supported, a first wiring supporter that supports the wiring member on a part between the two first link supporters, and a second wiring supporter that supports the wiring member on a part between the two second link supporters.

20 Claims, 13 Drawing Sheets

(56) References Cited

U.S. PATENT DOCUMENTS

2010/0185211 A1    7/2010   Herman et al.
2021/0059783 A1    3/2021   Haraguchi et al.

FOREIGN PATENT DOCUMENTS

| JP | 11-277481 A | 10/1999 |
| JP | 2005-177337 A | 7/2005 |
| JP | 2018-140456 A | 9/2018 |
| JP | 2018-175863 A | 11/2018 |

OTHER PUBLICATIONS

International Search Report for PCT/JP2020/020677 dated Jul. 14, 2020.
Written Opinion for PCT/JP2020/020677 dated Jul. 14, 2020.

* cited by examiner

SURGICAL INSTRUMENT HOLDING DEVICE AND SURGICAL ASSISTANCE DEVICE

CROSS REFERENCE TO RELATED APPLICATION

This U.S. application is a continuation application of International Application No. PCT/JP2020/020677 filed May 26, 2020, in the Japan Patent Office, the contents of which being incorporated by reference herein in its entirety.

BACKGROUND

The present disclosure relates to a surgical instrument holding device that holds a surgical instrument and a surgical assistance device that includes the surgical instrument holding device.

Recently, surgical operations using a surgical assistance device have been spreading. The surgical assistance device may include a holding device that hold a surgical instrument and may be provided with a parallel link and a wiring member for operating the surgical instrument. The position and bending degree of the wiring member change according to a pose of the parallel link. It is advantageous to prevent interference with another member and to prevent damage due to movement of the wiring member.

SUMMARY

It is an aspect to provide a surgical instrument holding device and a surgical assistance device that may appropriately dispose a wiring member along a parallel link.

According to an aspect of one or more embodiments, there is provided a surgical instrument holding device comprising a first parallel link in which two first link portions each having one end in an axial direction as a first end portion are arranged in parallel with each other; a second parallel link in which two second link portions each having one end in an axial direction as a second end portion are arranged in parallel with each other; a wiring member disposed along the first parallel link and the second parallel link; and a connector provided with two first link supporters by which the respective first end portions are rotatably supported, two second link supporters by which the respective second end portions are rotatably supported, a first wiring supporter configured to support the wiring member on a part between the two first link supporters, and a second wiring supporter configured to support the wiring member on a part between the two second link supporters.

According to another aspect of one or more embodiments, there is provided a surgical instrument holding device comprising a first parallel link comprising two first link portions arranged in parallel with each other; a second parallel link comprising two second link portions arranged in parallel with each other; a connector comprising two first link supporters rotatably connected to each of the two first link portions, respectively; two second link supporters rotatably connected to each of the two second link portions, respectively; a first wiring supporter provided between the two first link supporters, and a second wiring supporter provided between the two second link supporters; and a wire disposed between the two first link portions and between the two second link portions, the wire being supported by the first wiring supporter and the second wiring supporter.

According to yet another aspect of one or more embodiments, there is provided a surgical assistance device comprising the surgical instrument holding device configured to hold a surgical instrument at a distal end thereof.

BRIEF DESCRIPTION OF DRAWINGS

The above and/or other aspects will become apparent and more readily appreciated from the following description of exemplary embodiments, taken in conjunction with the accompanying drawings in which.

DETAILED DESCRIPTION

Figure 1:
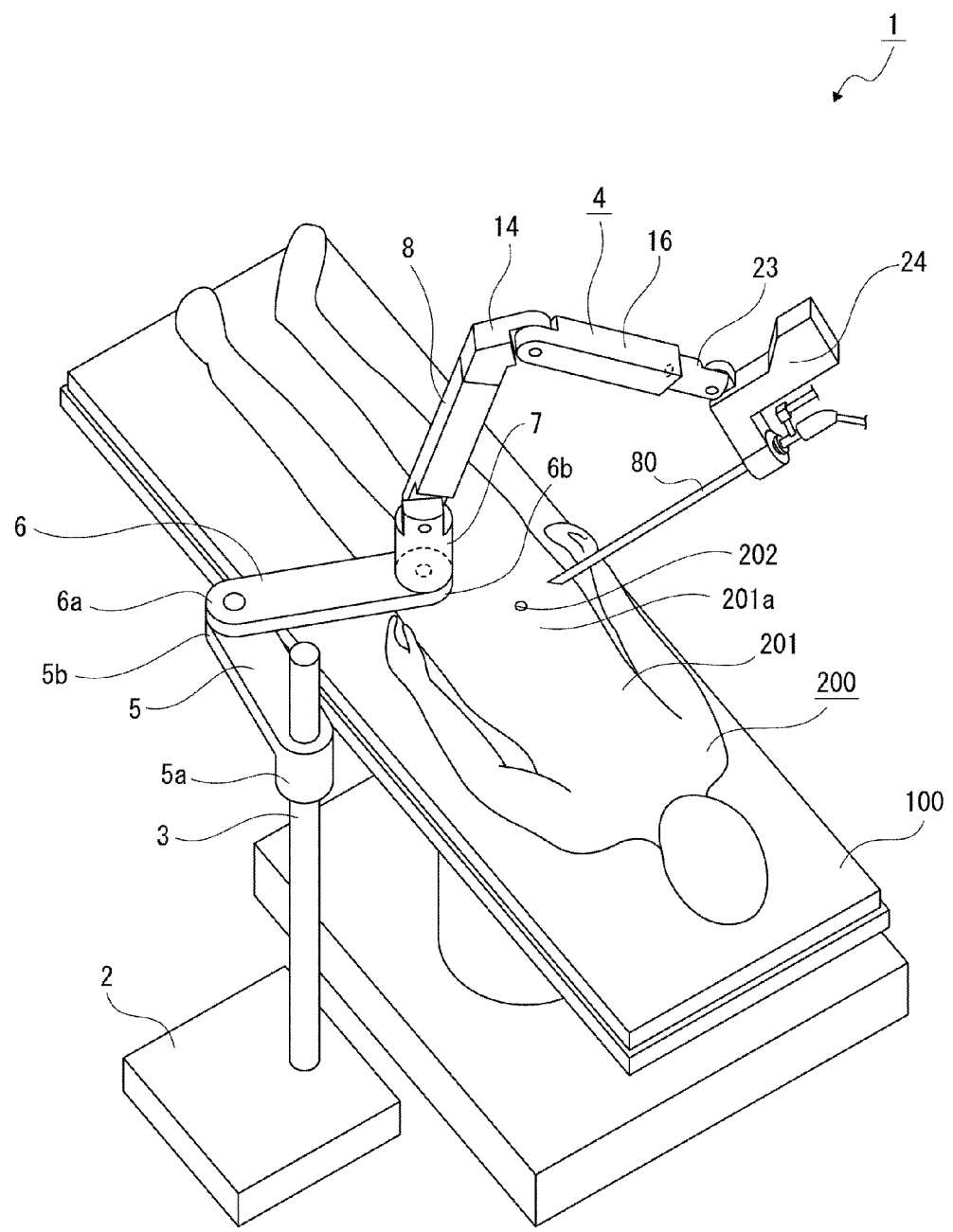
FIG. 1 depicts a schematic perspective view depicting a surgical assistance device according to some embodiments.

As described above, surgical operations using a surgical assistance device have been spreading. Such a surgical assistance device includes a holding unit that holds a surgical instrument such as an endoscope or forceps and a plurality of movable bodies for changing the position and pose of the surgical instrument.

There are many surgical instruments provided with an electrically operated actuator, and a wiring member for operating a surgical instrument may be provided along a parallel link.

In such a case, the position and bending degree of the wiring member change according to the pose of the parallel link. Therefore, in order to prevent interference with another member of the surgical assistance device and to prevent damage due to movement of the wiring member in the vicinity of a movable unit, it is advantageous to take a measure such as provision of a large space or improvement in strength of the member.

However, the provision of a large space leads to an increase in size of the movable unit. The improvement in strength of the member leads to an increase in cost of parts and an increase in weight.

A surgical instrument holding device and a surgical assistance device according to various embodiments described herein have been made in view of such problems. It is an aspect to provide a surgical instrument holding device and a surgical assistance device that may appropriately dispose a wiring member along a parallel link.

A surgical instrument holding device according to some embodiments may include a first parallel link in which two first link portions each having one end in an axial direction as a first end portion are arranged in parallel with each other, a second parallel link in which two second link portions each having one end in an axial direction as a second end portion are arranged in parallel with each other, a wiring member disposed along the first parallel link and the second parallel link, and a connector. The connector may be provided with two first link supporters by which the respective first end portions are rotatably supported, two second link supporters by which the respective second end portions are rotatably supported, a first wiring supporter configured to support the wiring member on a part between the two first link supporters, and a second wiring supporter configured to support the wiring member on a part between the two second link supporters.

Consequently, a distance between the first wiring supporter and the second wiring supporter is not changed.

The first wiring supporter and the second wiring supporter may support the wiring member in such a manner that the wiring member does not move in an axial direction of the wiring member.

Consequently, bending or the like of the wiring member disposed along the connector may be prevented.

In the surgical instrument holding device according to some embodiments, the wiring member may be supported by a part between end portions on a side opposite to the first end portions in the two first link portions and a part between end portions on a side opposite to the second end portions in the two second link portions.

Consequently, a length of the wiring member disposed along the first parallel link and a length of the wiring member disposed along the second parallel link are not changed easily.

In the surgical instrument holding device according to some embodiments, the wiring member may be supported by the first wiring supporter in a state in which the wiring member is rotatable in an in-plane direction of an arrangement surface on which the two first link supporters are arranged in the connector.

Consequently, even in the case of a wiring member having a certain degree of hardness and high flexural rigidity, the length of a part of the wiring member which part is disposed along the first parallel link and the connector is not greatly changed according to rotation of the first parallel link.

In the surgical instrument holding device according to some embodiments, the wiring member may be supported by the second wiring supporter in a state in which the wiring member is rotatable in an in-plane direction of an arrangement surface on which the two second link supporters are arranged in the connector.

Consequently, even in the case of a wiring member having a certain degree of hardness and high flexural rigidity, the length of a part of the wiring member which part is disposed along the connector and the second parallel link is not greatly changed according to rotation of the second parallel link.

The first wiring supporter in the surgical instrument holding device according to some embodiments may include a first supporting projecting portion, and a first rotary pedestal that has a fixing portion configured to fix the wiring member and a first insertion hole into which the first supporting projecting portion is inserted, and that is rotatable with respect to the first supporting projecting portion, may be in some embodiments included.

Consequently, the first rotary pedestal is rotated in such a manner as to slide on the arrangement surface of the connector.

The second wiring supporter in the surgical instrument holding device according to some embodiments may include a second supporting projecting portion, and a second rotary pedestal that has a fixing portion configured to fix the wiring member and a second insertion hole into which the second supporting projecting portion is inserted, and that is rotatable with respect to the second supporting projecting portion, may be in some embodiments included.

Consequently, the second rotary pedestal is rotated in such a manner as to slide on the arrangement surface of the connector.

A surgical assistance device according to some embodiments may be a surgical assistance device including a surgical instrument holding device configured to hold a surgical instrument. The surgical instrument holding device may include a first parallel link in which two first link portions each having one end in an axial direction as a first end portion are arranged in parallel with each other, a second parallel link in which two second link portions each having one end in an axial direction as a second end portion are arranged in parallel with each other, a wiring member disposed along the first parallel link and the second parallel link, and a connector. The connector may be provided with two first link supporters by which the respective first end portions are rotatably supported, two second link supporters by which the respective second end portions are rotatably supported, a first wiring supporter configured to support the wiring member on a part between the two first link supporters, and a second wiring supporter configured to support the wiring member on a part between the two second link supporters.

Consequently, in the surgical instrument holding device, the distance between the first wiring supporter and the second wiring supporter is not changed.

According to various embodiments, it is possible to appropriately dispose a wiring member along a parallel link.

A surgical instrument holding device and a surgical assistance device according to various embodiments will hereinafter be described with reference to the accompanying drawings.

The various embodiments illustrated in the following represent an example in which the surgical assistance device is applied as a surgical assistance device of a type used in a state of being installed on a floor of an operating room or the like. However, the scope of application of the surgical assistance device is not limited to the type used in a state of being installed on the floor of an operating room or the like, and the surgical assistance device can also be applied as a type used in a state of being attached to a ceiling or a wall surface of an operating room.

In this specification and in the drawings, forward and rearward, upward and downward, and leftward and rightward directions are directions for the convenience of description, and directions are not limited to these directions in carrying out the embodiments.

The surgical assistance device described below has a configuration in which movable bodies are rotated. This "rotation" denotes an operation in an axial rotation direction about a reference axis (central axis) and includes not only an operation in the axial rotation direction within a predetermined angle but also an operation of rotating by 360 degrees or more.

The description will proceed in the following order.
  <1. General Configuration of Surgical Assistance Device and Like>
  <2. Cable Wiring>
  <3. Modification of Wiring Supporter>
  <4. Another Modification of Wiring Supporter>
  <5. Others>

<1. General Configuration of Surgical Assistance Device and Like>

A general configuration of a surgical assistance device 1 and the like will first be described (see FIG. 1 and FIG. 2).

An operating table 100 is installed in the operating room. A patient 200 is laid down on his or her back, for example, on the operating table 100 (see FIG. 1). A port 202 is formed in a part forming a body cavity 201 of the patient 200, for example, an abdominal wall 201a. A part (distal end portion) of a surgical instrument to be described later is inserted into the port 202 when a surgical operation is performed. The port 202 is a small hole into which a shaft-shaped surgical instrument is inserted.

The surgical assistance device 1 includes a base 2 placed on a floor of the operating room or the like, a pole 3 in a round shaft shape which pole is fixed to the base 2, and a main body 4 supported by the pole 3. The base 2 is installed on the floor or the like on a side of the operating table 100. A lower end portion of the pole 3 is fixed to the base 2 in a state in which the pole 3 extends vertically.

The main body 4 is supported by the pole 3 in such a manner as to be movable in an upward-downward direction. The main body 4 is formed of a configuration in which each part thereof is connected in a rotatable state. The main body 4 can be fixed to the pole 3 at a desired position in the upward-downward direction.

The main body 4 includes a first connecting arm 5 and a second connecting arm 6 rotatably connected to each other.

The first connecting arm 5 is formed in a shape extending in a horizontal direction. One end portion in a longitudinal direction of the first connecting arm 5 is provided as a supported tubular portion 5a. Another end portion in the longitudinal direction of the first connecting arm 5 is provided as a pivot portion 5b. The pole 3 is inserted through the supported tubular portion 5a of the first connecting arm 5. The first connecting arm 5 can be manually or electrically moved in the upward-downward direction with respect to the pole 3 and can be rotated in an axial rotation direction with respect to the pole 3 with the supported tubular portion 5a as a pivot.

The first connecting arm 5 can be fixed to the pole 3 at a desired position in the upward-downward direction and at a desired position in the axial rotation direction.

The second connecting arm 6 is formed in a shape extending in the horizontal direction. One end portion in a longitudinal direction of the second connecting arm 6 is provided as a pivot portion 6a. Another end portion in the longitudinal direction of the second connecting arm 6 is provided as a supporting shaft portion 6b. The pivot portion 6a of the second connecting arm 6 is vertically superposed on the pivot portion 5b of the first connecting arm 5. The pivot portion 6a of the second connecting arm 6 and the pivot portion 5b of the first connecting arm 5 are connected to each other in a state being rotatable with respect to each other. The second connecting arm 6 can be manually or electrically rotated with respect to the first connecting arm 5 with the pivot portion 6a as a pivot.

The main body 4 includes a first movable body 7 that functions as a joint section. The first movable body 7 is rotatably connected to the supporting shaft portion 6b of the second connecting arm 6 (see FIG. 1 and FIG. 2).

An end portion on the second connecting arm 6 side of the first movable body 7 is provided as a proximal end side connecting portion 7a. An end portion of the first movable body 7 which end portion is on a side opposite to the second connecting arm 6 side is provided as a distal end side connecting portion 7b. The proximal end side connecting portion 7a of the first movable body 7 is rotatably connected to the supporting shaft portion 6b of the second connecting arm 6. The first movable body 7 is, for example, rotated with respect to the second connecting arm 6 in an axial rotation direction about a reference axis extending in the upward-downward direction. Hence, because the first movable body 7 is rotated with respect to the second connecting arm 6, the surgical assistance device 1 has one degree of freedom in an operating direction.

The main body 4 includes a second movable body 8 that functions as an arm section. The second movable body 8 is rotatably connected to the distal end side connecting portion 7b of the first movable body 7.

One end portion in a longitudinal direction of the second movable body 8 is provided as a proximal end side connecting portion 8a. Another end portion in the longitudinal direction of the second movable body 8 is provided as a distal end side connecting portion 8b. The proximal end side connecting portion 8a of the second movable body 8 is rotatably connected to the distal end side connecting portion 7b of the first movable body 7. The second movable body 8 is, for example, rotated with respect to the first movable body 7 in an axial rotation direction about a reference axis extending in a direction orthogonal to a connecting direction of the second movable body 8 and the first movable body 7. Hence, because the second movable body 8 is rotated with respect to the first movable body 7, the surgical assistance device 1 has one degree of freedom in an operating direction.

The second movable body 8 is provided with a first parallel link 9. The first parallel link 9 includes two pairs of parallel link portions 10 and coupling pins 11 that couple the link portions 10 to each other.

In the following description, of the two pairs of link portions 10, one pair of link portions 10 provided along the longitudinal direction of the second movable body 8 will be described as first link portions 10A, and the other pair of link portions 10 will be described as link portions 10B.

One end portions of the first link portions 10A are provided as proximal end side end portions 12 connected in a rotatable state to the distal end side connecting portion 7b of the first movable body 7. Other end portions of the first link portions 10A are provided as first end portions 13 connected in a rotatable state to one end portion of an intermediate connecting member 14. The intermediate connecting member 14 is provided with two first link supporters 15 for supporting the first end portions 13 of the first link portions 10A. The first link supporters 15 support the first end portions 13 of the first link portions 10A by, for example, supporting the coupling pins 11.

In some embodiments, a surface provided with the first link supporters 15 in the intermediate connecting member 14 is provided as an arrangement surface 14a.

The position and pose of the intermediate connecting member 14 are determined naturally according to a rotational state of the second movable body 8 with respect to the first movable body 7.

In some embodiments, in a case where the respective one end portions of the first link portions 10A of the second movable body 8 are connected to the distal end side connecting portion 7b of the first movable body 7, a part of the distal end side connecting portion 7b can be regarded as a link portion 10B.

Similarly, in a case where the respective other end portions of the first link portions 10A of the second movable body 8 are connected to the intermediate connecting member 14, a part of the intermediate connecting member 14 can be regarded as a link portion 10B. The link portion 10B does not necessarily need to be a rod shape formed linearly and may be a curved end portion in the intermediate connecting member 14.

The main body 4 includes a third movable body 16 that functions as an arm section. The third movable body 16 is connected to the intermediate connecting member 14. One end portion in a longitudinal direction of the third movable body 16 is provided as a proximal end side connecting portion 16a. Another end portion in the longitudinal direction of the third movable body 16 is provided as a distal end side connecting portion 16b. The proximal end side connecting portion 16a of the third movable body 16 is connected to the intermediate connecting member 14. The third movable body 16 is, for example, rotated with respect to the intermediate connecting member 14 in an axial rotation direction about a reference axis extending in a direction orthogonal to a connecting direction of the third movable body 16 and the intermediate connecting member 14. Hence, because the third movable body 16 is rotated with respect to the intermediate connecting member 14, the surgical assistance device 1 has one degree of freedom in an operating direction.

The third movable body 16 is provided with a second parallel link 17. The second parallel link 17 includes two pairs of parallel link portions 18 and coupling pins 19 that couple the link portions 18 to each other.

In the following description, of the two pairs of link portions 18, one pair of link portions 18 provided along the longitudinal direction of the third movable body 16 will be described as second link portions 18A, and the other pair of link portions 18 will be described as link portions 18B.

One end portions of the second link portions 18A are provided as second end portions 20 connected in a rotatable state to another end portion of the intermediate connecting member 14. Other end portions of the second link portions 18A are provided as distal end side end portions 21. The arrangement surface 14a of the intermediate connecting member 14 is provided with two second link supporters 22 for supporting the second end portions 20 of the second link portions 18A. The second link supporters 22 support the second end portions 20 of the second link portions 18A by, for example, supporting the coupling pins 19.

The main body 4 has a fourth movable body 23 that functions as a joint section. The fourth movable body 23 is rotatably connected to the distal end side connecting portion 16b of the third movable body 16. An end portion on the third movable body 16 side of the fourth movable body 23 is provided as a proximal end side connecting portion 23a. An end portion of the fourth movable body 23 which end portion is on a side opposite to the third movable body 16 is provided as a distal end side connecting portion 23b. The proximal end side connecting portion 23a of the fourth movable body 23 is rotatably connected to the distal end side connecting portion 16b of the third movable body 16, that is, the distal end side end portions 21 of the second link portions 18A. The fourth movable body 23 is, for example, rotated with respect to the third movable body 16 in an axial rotation direction about a reference axis extending in a connecting direction of the fourth movable body 23 and the third movable body 16. Hence, because the fourth movable body 23 is rotated with respect to the third movable body 16, the surgical assistance device 1 has one degree of freedom in an operating direction.

In some embodiments, in a case where the respective one end portions of the second link portions 18A of the third movable body 16 are connected to the intermediate connecting member 14, a part of the intermediate connecting member 14 can be regarded as a link portion 18B.

Similarly, in a case where the respective other end portions of the second link portions 18A of the third movable body 16 are connected to the proximal end side connecting portion 23a of the fourth movable body 23, a part of the proximal end side connecting portion 23a can be regarded as a link portion 18B.

In some embodiments, the link portions may be curved end portions in the respective members.

The first movable body 7, the second movable body 8, the third movable body 16, and the fourth movable body 23 described above are rotated by a driving force of an electric actuator not depicted, for example. In some embodiments, the first movable body 7, the second movable body 8, the third movable body 16, and the fourth movable body 23 may be rotated by a driving force of a pneumatic actuator.

The main body 4 includes a surgical instrument holder 24. The surgical instrument holder 24 is rotatably connected to the distal end side connecting portion 23b of the fourth movable body 23. Hence, because the surgical instrument holder 24 is rotated with respect to the fourth movable body 23, the surgical assistance device 1 has one degree of freedom in an operating direction.

The surgical instrument holder 24 holds a surgical instrument 80 such as forceps or an endoscope (see FIG. 1).

Figure 2:
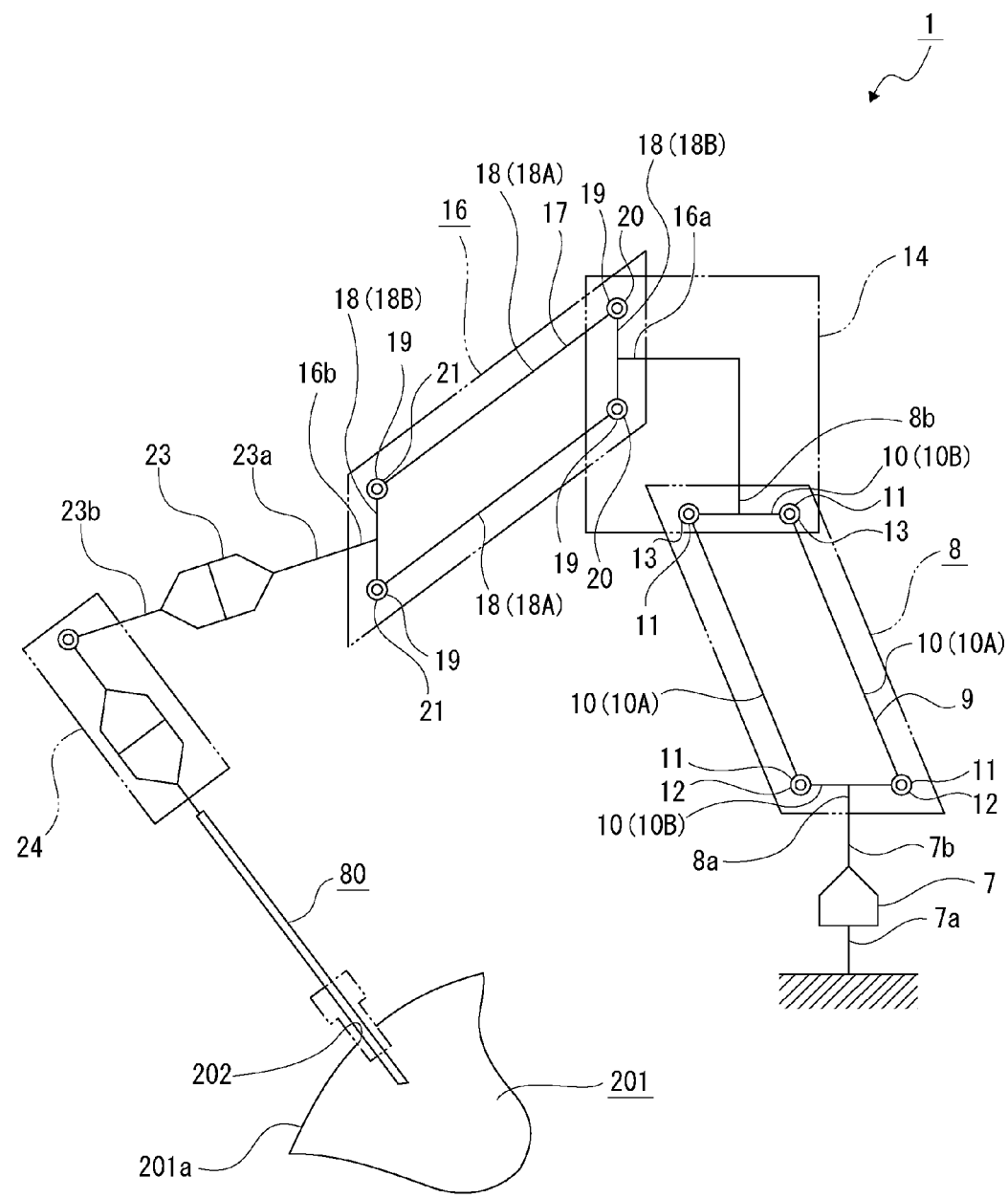
FIG. 2 is a conceptual diagram of the surgical assistance device of FIG. 1, according to some embodiments.

In some embodiments, as depicted in FIG. 2, the surgical instrument holder 24 has a mechanism that can rotate the surgical instrument 80 in an axial rotation direction. Hence, because the surgical instrument holder 24 has a configuration for rotating the surgical instrument 80 in the axial rotation direction, the surgical assistance device 1 has one degree of freedom in an operating direction.

<2. Cable Wiring>

The surgical assistance device 1 includes a motor, an actuator, a control board, and the like provided in respective parts and a cable 25 connected thereto. The cable 25 is used for transmission and reception of various kinds of control information or the like.

The cable 25 is routed along the first movable body 7, the second movable body 8, the intermediate connecting member 14, the third movable body 16, and the fourth movable body 23 included in the main body 4. Hence, the shape of the cable 25 is changed according to movements of the respective movable bodies.

Figure 3:
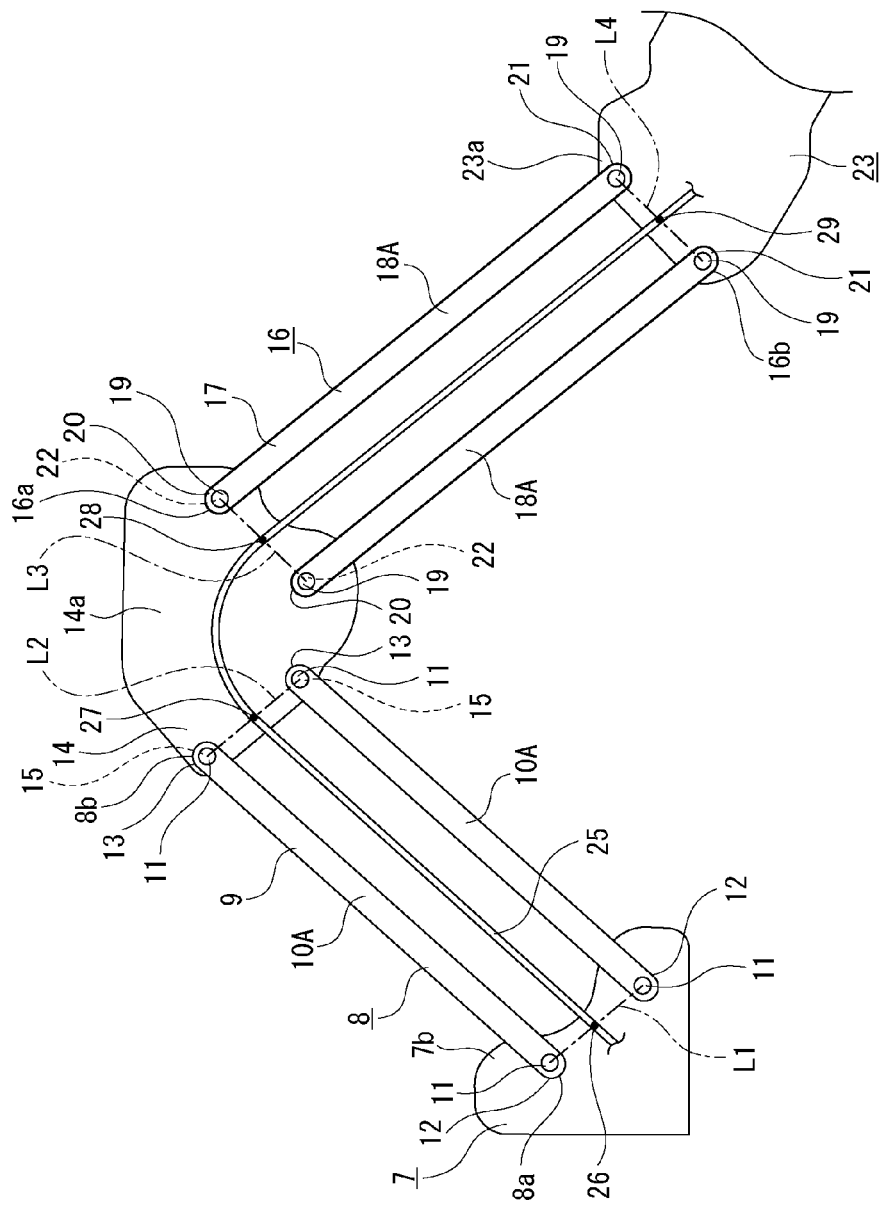
FIG. 3 is a schematic diagram depicting a wiring example of a cable disposed along a second movable body, an intermediate connecting member, and a third movable body of the surgical assistance device, according to some embodiments.

FIG. 3 specifically depicts a wiring example of the cable 25 disposed along the second movable body 8, the intermediate connecting member 14, and the third movable body 16.

The cable 25 is routed in such a manner as to pass through a midpoint 26 of an imaginary line segment L1 connecting the coupling pins 11 positioned on the first movable body 7 side to each other and a midpoint 27 of an imaginary line segment L2 connecting the coupling pins 11 positioned on the intermediate connecting member 14 side to each other.

The cable 25 is routed in such a manner as to pass through a midpoint 28 of an imaginary line segment L3 connecting the coupling pins 19 positioned on the intermediate connecting member 14 side to each other and a midpoint 29 of an imaginary line segment L4 connecting the coupling pins 19 positioned on the fourth movable body 23 side to each other.

A distance between the midpoint 26 and the midpoint 27 is substantially the same as the length of the first link portions 10A, and is a fixed length irrespective of a rotational state of the first link portions 10A with respect to the first movable body 7 and a rotational state of the first link portions 10A with respect to the intermediate connecting member 14.

A positional relation between the midpoint 27 and the midpoint 28 is not changed irrespective of a rotational state of the first link portions 10A with respect to the intermediate connecting member 14 and a rotational state of the second link portions 18A with respect to the intermediate connecting member 14.

In some embodiments, a distance between the midpoint 28 and the midpoint 29 is substantially the same as the length of the second link portions 18A, and is a fixed length irrespective of a rotational state of the second link portions 18A with respect to the intermediate connecting member 14 and a rotational state of the second link portions 18A with respect to the fourth movable body 23.

Because the cable 25 routed along the second movable body 8, the intermediate connecting member 14, and the third movable body 16 is attached in such a manner as to pass through the midpoints 26, 27, 28, and 29, the length of a part of the cable 25 from the midpoint 26 to the midpoint 29 is not changed.

Hence, the relative position of the cable 25 with respect to each part is not easily changed according to the rotational state of each part, and a large space for allowing movement of the cable 25 does not need to be provided. It is thus possible, for example, to reduce the size and weight of the intermediate connecting member 14.

In some embodiments, in order to reduce the movement of the cable 25, the cable 25 may be supported at the respective positions of the midpoints 26, 27, 28, and 29. Specifically, it is advantageous to support the cable 25 at the position of the midpoint 26 by the first movable body 7, support the cable 25 at the position of the midpoint 27 and the position of the midpoint 28 by the intermediate connecting member 14, and support the cable 25 at the position of the midpoint 29 by the fourth movable body 23.

In some embodiments, the cable 25 may be supported at the positions of the midpoints 26, 27, 28, and 29 in such a manner that the cable 25 does not move in an axial direction of the cable 25. Consequently, excessive bending or excessive tension of the cable 25 is suppressed, and it is possible to protect the cable 25 and prevent the cable 25 from being caught, for example.

For this purpose, a part in which the midpoint 26 is located in the first movable body 7 is provided with a proximal end side wiring supporter 30 that supports the cable 25. (See, e.g., FIG. 4)

In some embodiments, the arrangement surface 14a of the intermediate connecting member 14 is provided with a first wiring supporter 31 that supports the cable 25 on a part in which the midpoint 27 is located and a second wiring supporter 32 that supports the cable 25 on a part in which the midpoint 28 is located.

Figure 4:
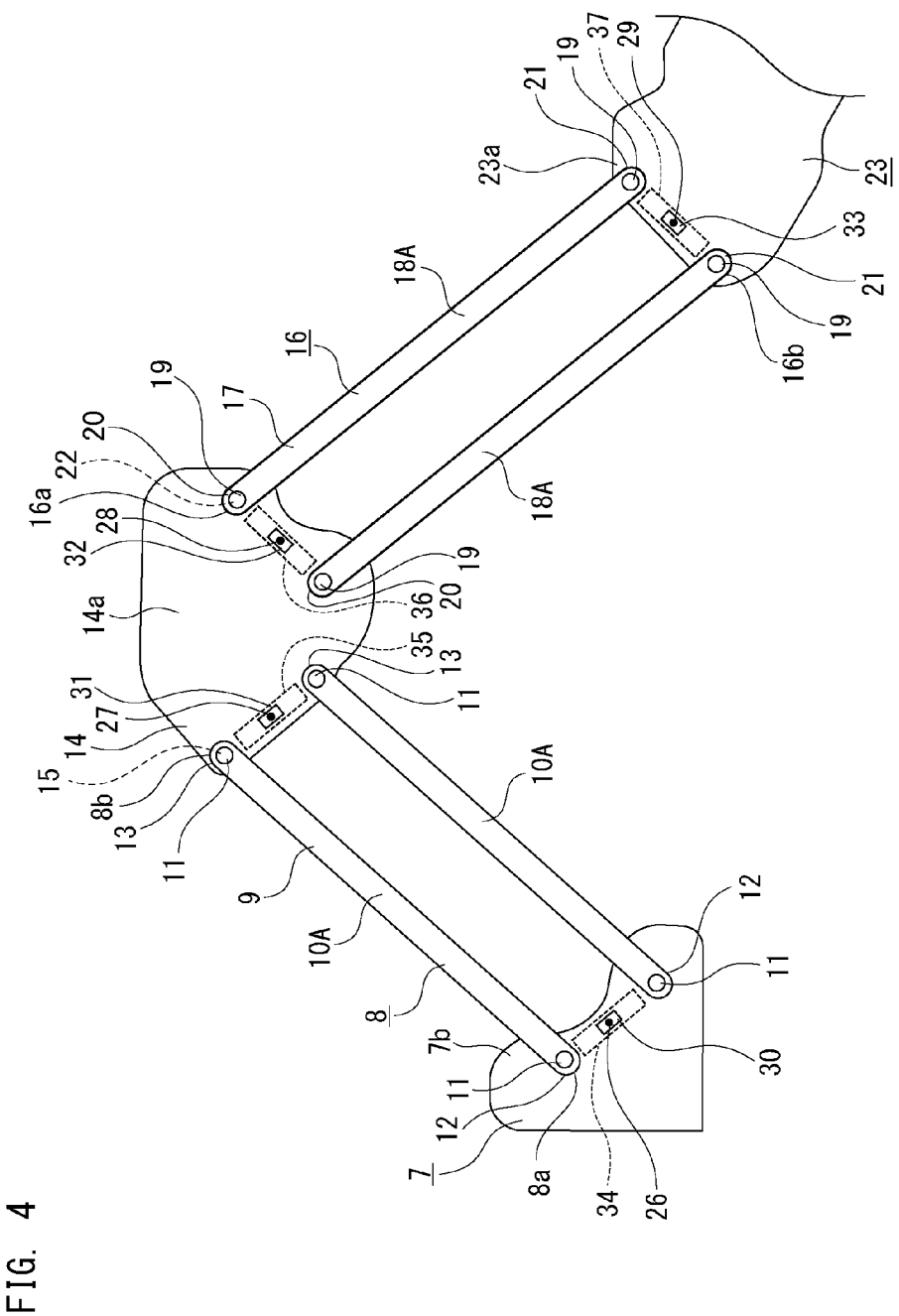
FIG. 4 is a diagram depicting an example of wiring supporters provided to a first movable body, the intermediate connecting member, and a fourth movable body of the surgical assistance device, according to some embodiments.

In some embodiments, a part in which the midpoint 29 is located in the fourth movable body 23 is provided with a distal end side wiring supporter 33 that supports the cable 25 (see FIG. 4).

The proximal end side wiring supporter 30 is provided in a first region 34, which is a part between parts to which the coupling pins 11 are attached in the first movable body 7.

The first wiring supporter 31 is provided in a second region 35, which is a part between parts to which the coupling pins 11 are attached in the intermediate connecting member 14.

The second wiring supporter 32 is provided in a third region 36, which is a part between parts to which the coupling pins 19 are attached in the intermediate connecting member 14.

The distal end side wiring supporter 33 is provided in a fourth region 37, which is a part between parts to which the coupling pins 19 are attached in the fourth movable body 23.

The first region 34, the second region 35, the third region 36, and the fourth region 37 are each depicted as a region indicated by a dotted line in FIG. 4.

Figure 5:
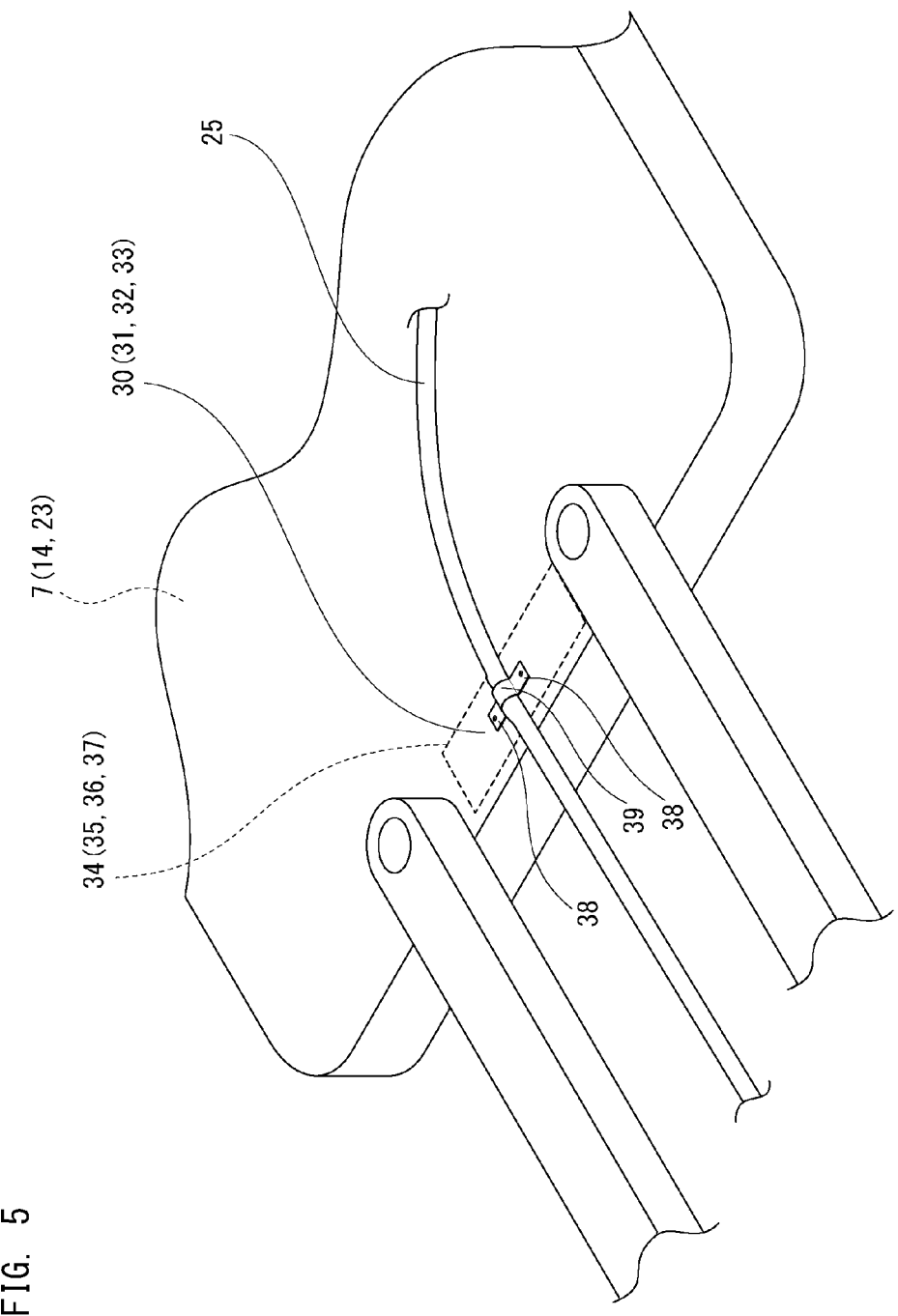
FIG. 5 is a schematic perspective view depicting an example of configuration of a wiring supporter, according to some embodiments.

FIG. 5 depicts an example of configuration of the proximal end side wiring supporter 30, the first wiring supporter 31, the second wiring supporter 32, and the distal end side wiring supporter 33. In this specification, when the proximal end side wiring supporter 30, the first wiring supporter 31, the second wiring supporter 32, and the distal end side wiring supporter 33 are not distinguished from one another, the proximal end side wiring supporter 30, the first wiring supporter 31, the second wiring supporter 32, and the distal end side wiring supporter 33 will be described as a "wiring supporter."

The wiring supporter is formed in a plate shape having a central portion curved in an arcuate manner, and has end portions as attaching portions 38 and the arcuate part as a holding portion 39. That is, the wiring supporter may be a plate including the holding portion 39 and the attaching portions 38 as illustrated in FIG. 5.

The attaching portions 38 of each wiring supporter are attached to the respective portion (the first region 34, the second region 35, the third region 36, or the fourth region 37) by an attaching member such as a screw in a state in which the holding portion 39 holds the cable 25 down on the respective portion (the first region 34, the second region 35, the third region 36, or the fourth region 37).

Movements of the cable 25 in the axial direction and other directions are thus limited.

Figure 6:
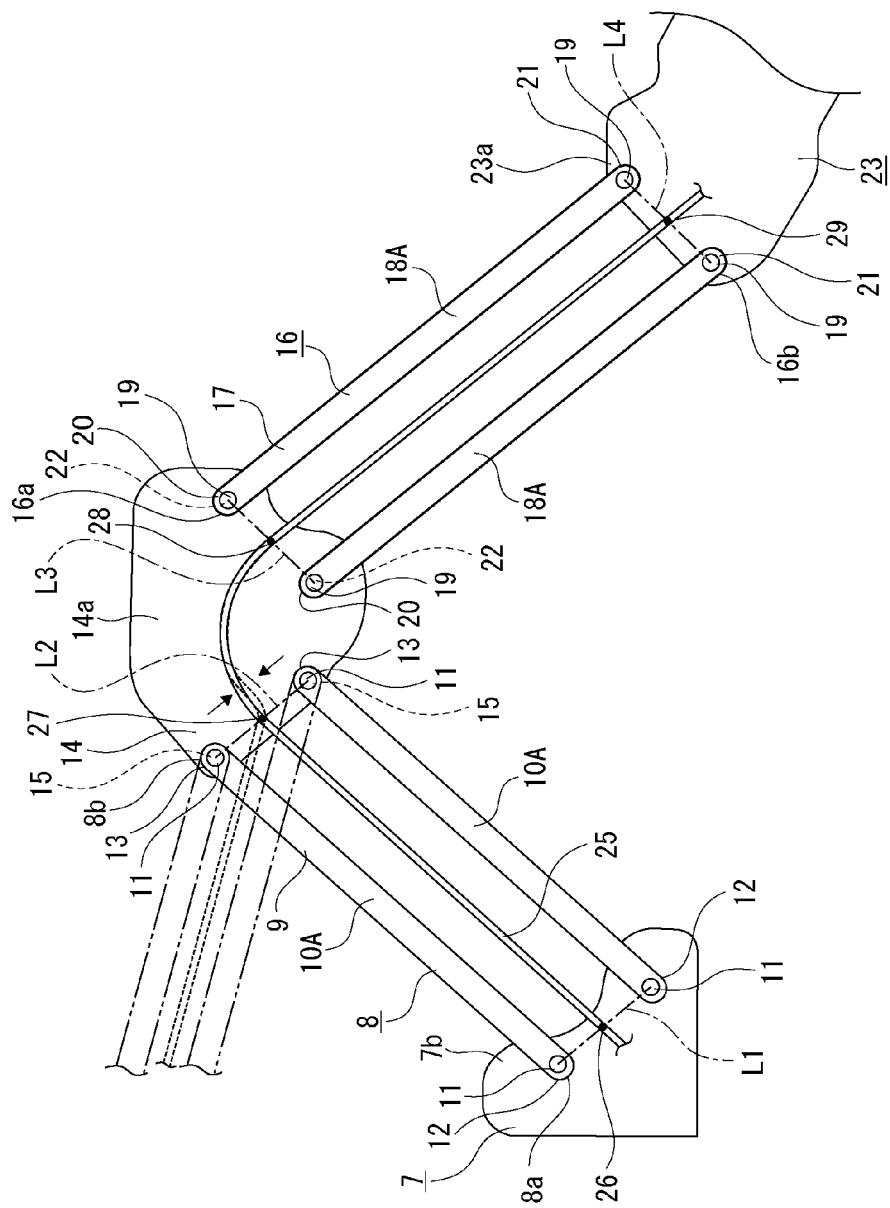
FIG. 6 is a schematic diagram depicting a change in position of the cable, according to some embodiments.

In some embodiments, in a case where the cable 25 has a certain degree of flexural rigidity (hardness), the position of the cable 25 changes even when the cable 25 is supported at the positions of the midpoints 26, 27, 28, and 29 (see a part indicated by arrows in FIG. 6).

Figure 7:
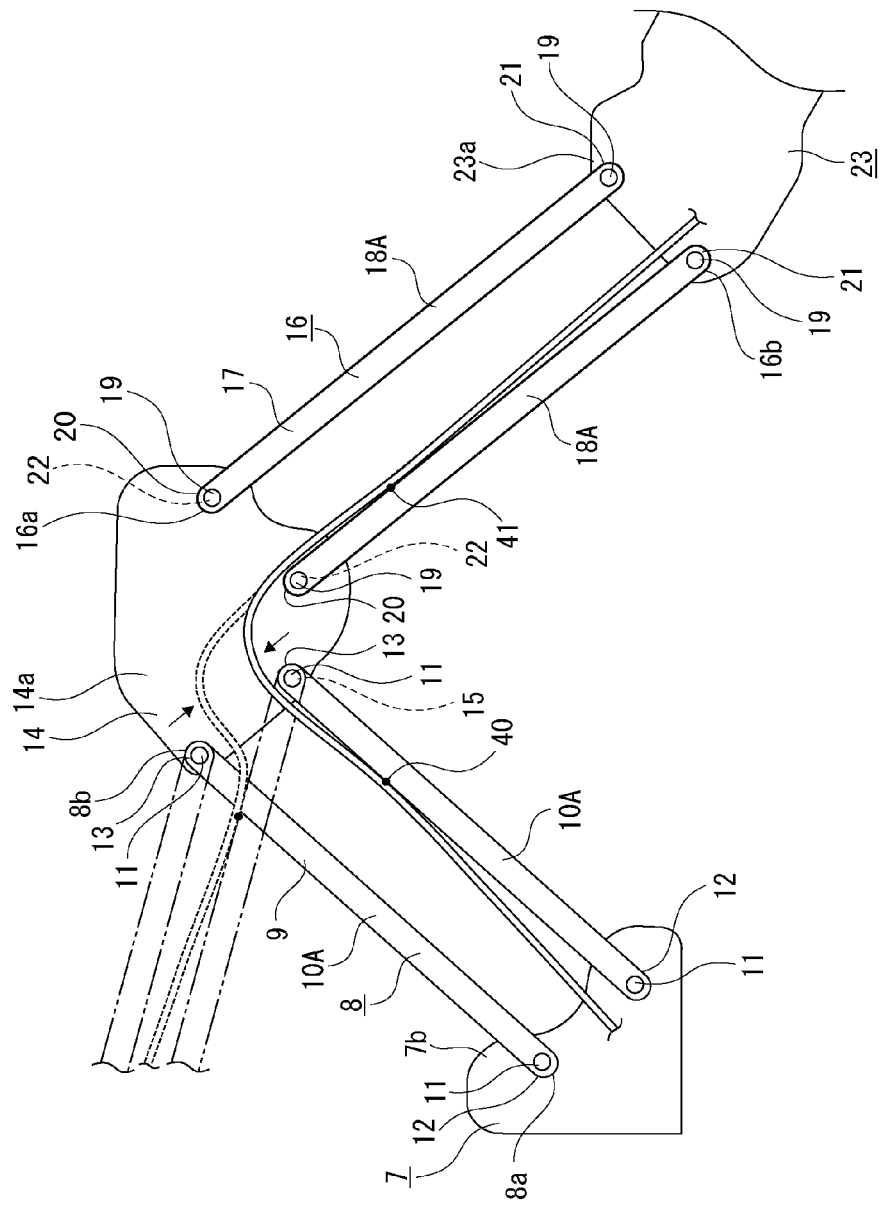
FIG. 7 is a schematic diagram depicting a change in position of the cable according to a related art cable fixing method.

On the other hand, FIG. 7 depicts an example of a related art method of fixing a conventional cable 25. As depicted in the figure, the cable 25 is fixed at a fixing point 40 set on a first link portion 10A and a fixing point 41 set on a second link portion 18A.

A comparison between FIG. 6 and FIG. 7 indicates that supporting the cable 25 at the positions of the midpoints 26, 27, 28, and 29 limits an amount of movement of the cable 25 and makes it possible to reduce a space provided to allow movement of the cable 25.

<3. Modification of Wiring Supporter>

A modification of the configuration of the wiring supporter will be described.

In some embodiments, in the following description, the first wiring supporter 31 will be taken as an example.

Figure 8:
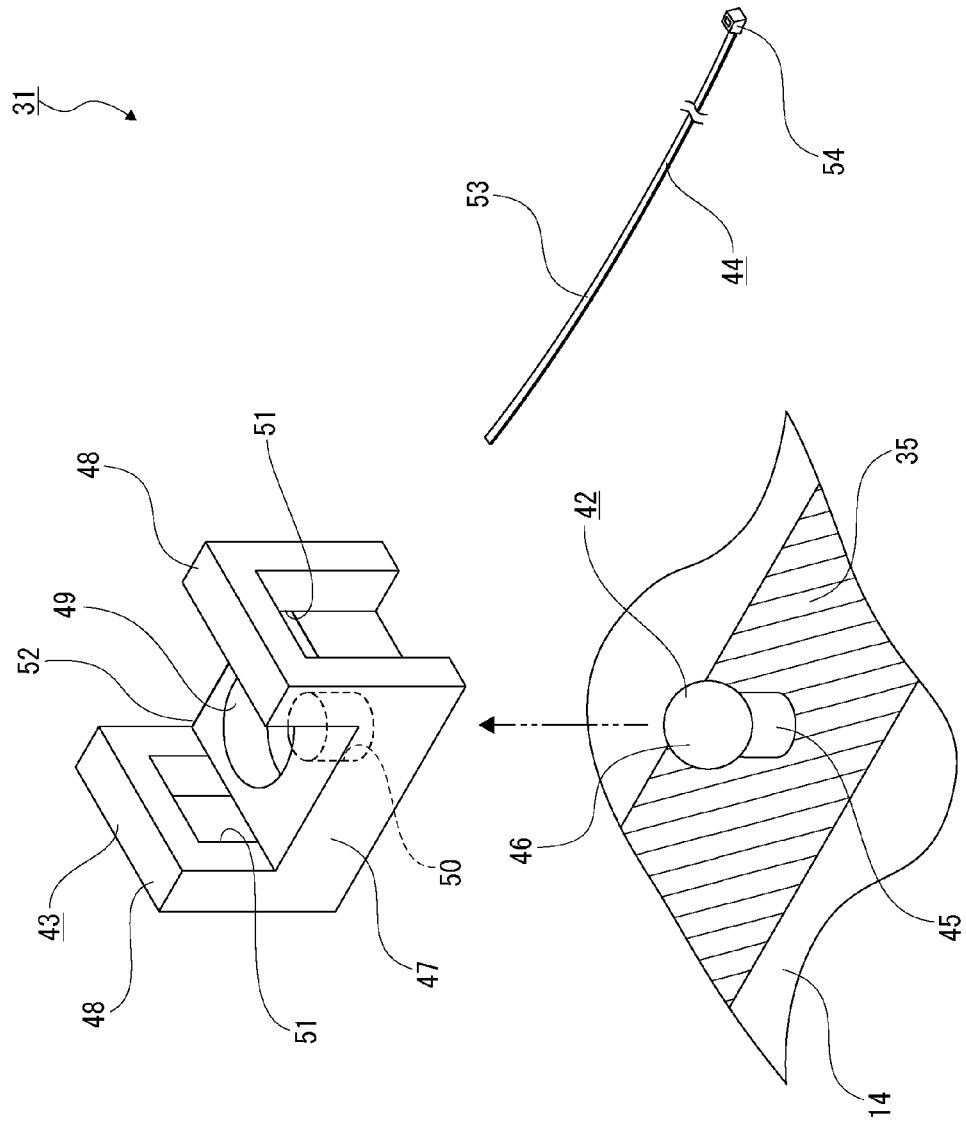
FIG. 8 is an exploded perspective view of a modification of the wiring supporter, according to some embodiments.

As depicted in FIG. 8, the first wiring supporter 31 includes a spherical projecting portion 42 formed on the second region 35 of the intermediate connecting member 14, a supporting member 43 attached to the spherical projecting portion 42, and a fixing member 44 for fixing the cable 25 to the supporting member 43.

The spherical projecting portion 42 includes a cylindrical neck portion 45 and a spherical head portion 46 continuous with a distal end portion of the neck portion 45.

The supporting member 43 includes a base portion 47 formed in a rectangular parallelepipedic shape and one pair of projecting portions 48 formed on both end portions in a longitudinal direction of the base portion 47.

A locking recessed portion 49 as a cylindrical recessed portion is formed in the base portion 47. A through hole 50 having a diameter slightly smaller than that of the head portion 46 of the spherical projecting portion 42 is formed in a center of a bottom portion of the locking recessed portion 49.

The supporting member 43 is attached to the second region 35 by the head portion 46 of the spherical projecting portion 42 being inserted into the through hole 50 and set in a state of being positioned in the locking recessed portion 49.

An insertion hole 51 into which the fixing member 44 is inserted is formed in each of the projecting portions 48.

A recessed portion formed in a roughly U-shape by the base portion 47 and the two projecting portions 48 is formed as a fixing recessed portion 52 to which the cable 25 is fixed.

The fixing member 44 is, for example, a binding band including a band portion 53 formed in a plate shape and a locking portion 54 continuous with one end of the band portion 53.

Figure 9:
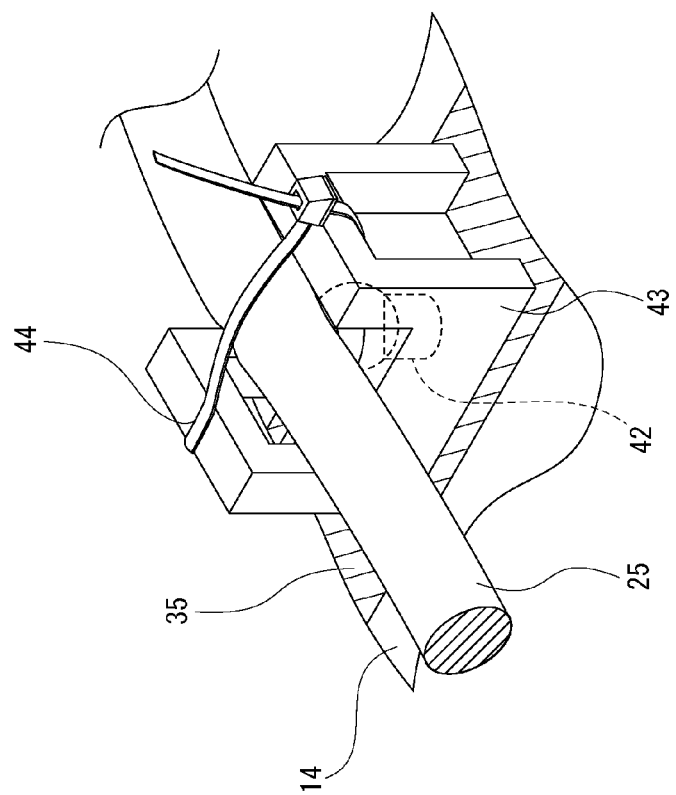
FIG. 9 is a perspective view depicting a state in which the cable is supported by the wiring supporter in the modification of the wiring supporter of FIG. 8, according to some embodiments.

The band portion 53 of the fixing member 44 is inserted into the two insertion holes 51 in a state in which the cable 25 is positioned in the fixing recessed portion 52, and thus, the fixing member 44 fixes the cable 25 to the supporting member 43 (see FIG. 9).

Figure 10:
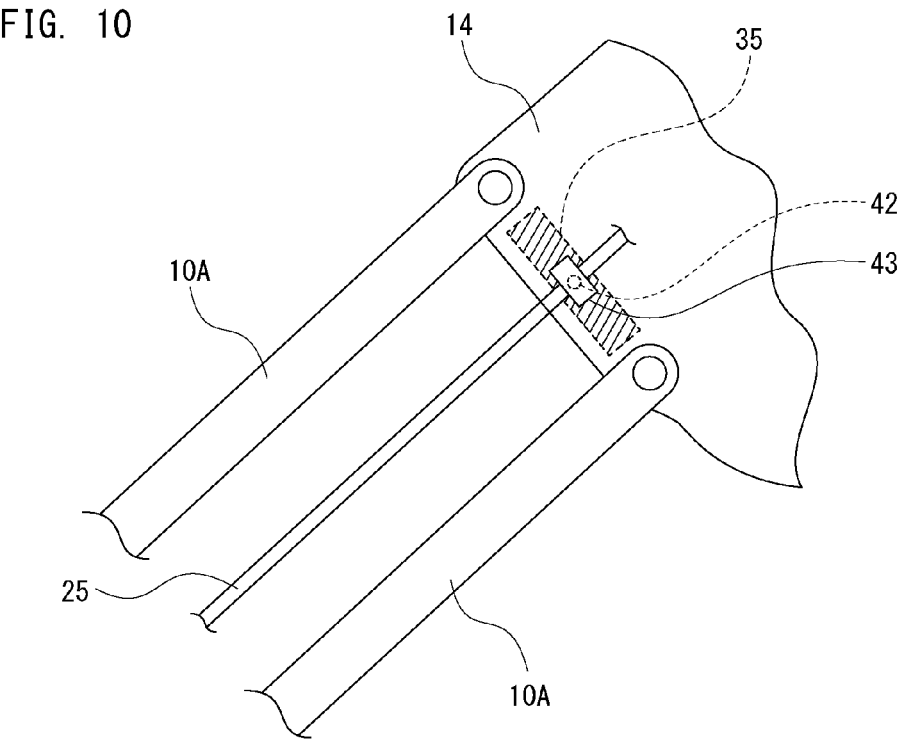
FIG. 10 is a schematic diagram depicting a rotational state of first link portions with respect to the intermediate connecting member and the position and bending degree of the cable in the modification of the wiring supporter of FIG. 8, according to some embodiments.
Figure 11:
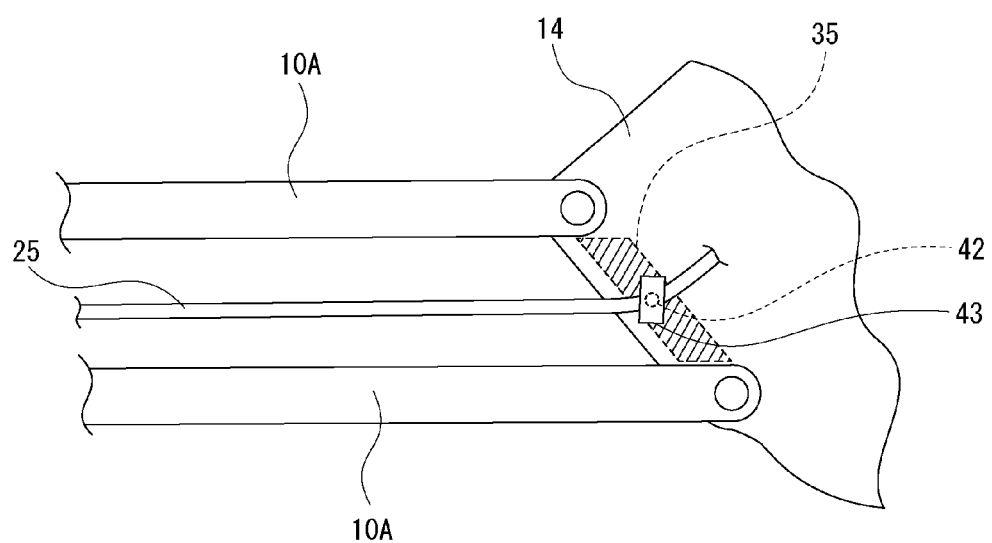
FIG. 11 is a schematic diagram depicting the position and bending degree of the cable in a case where the rotational state of the first link portions with respect to the intermediate connecting member is changed in the modification of the wiring supporter of FIG. 8, according to some embodiments.

The supporting member 43 is capable of rotation in an in-plane direction of the second region 35 with respect to the spherical projecting portion 42. For example, as depicted in FIG. 10 and FIG. 11, the supporting member 43 is rotated with respect to the spherical projecting portion 42 according to the rotational state of the first link portions 10A with respect to the intermediate connecting member 14.

Consequently, a decrease in bending radius of the cable 25 due to application of an excessive load to the cable 25 is suppressed. It is therefore possible to prevent damage to the cable 25 and a break in a communication line within the cable 25.

In some embodiments, while a configuration has been taken as an example in which the first wiring supporter 31 and the other wiring supporters include the spherical projecting portion 42 having the head portion 46 formed in a spherical shape, the head portion 46 does not need to be formed in a spherical shape as long as the supporting member 43 is configured to be rotatable within a plane parallel with the attaching surface. For example, the spherical projecting portion 42 may include a head portion 46 formed in a cylindrical shape.

<4. Another Modification of Wiring Supporter>

Description will be made of a modification of the wiring supporter and the region to which the wiring supporter is attached (second region 35 or the like).

In the above-described example, description has been made of a case where the wiring supporter is rotated with respect to the second region 35.

In the present modification, description will be made of a case where a part of the region to which the wiring supporter is attached is rotated together with the wiring supporter. In some embodiments, the second region 35 and the first wiring supporter 31 attached to the second region 35 will be taken as an example.

Figure 12:
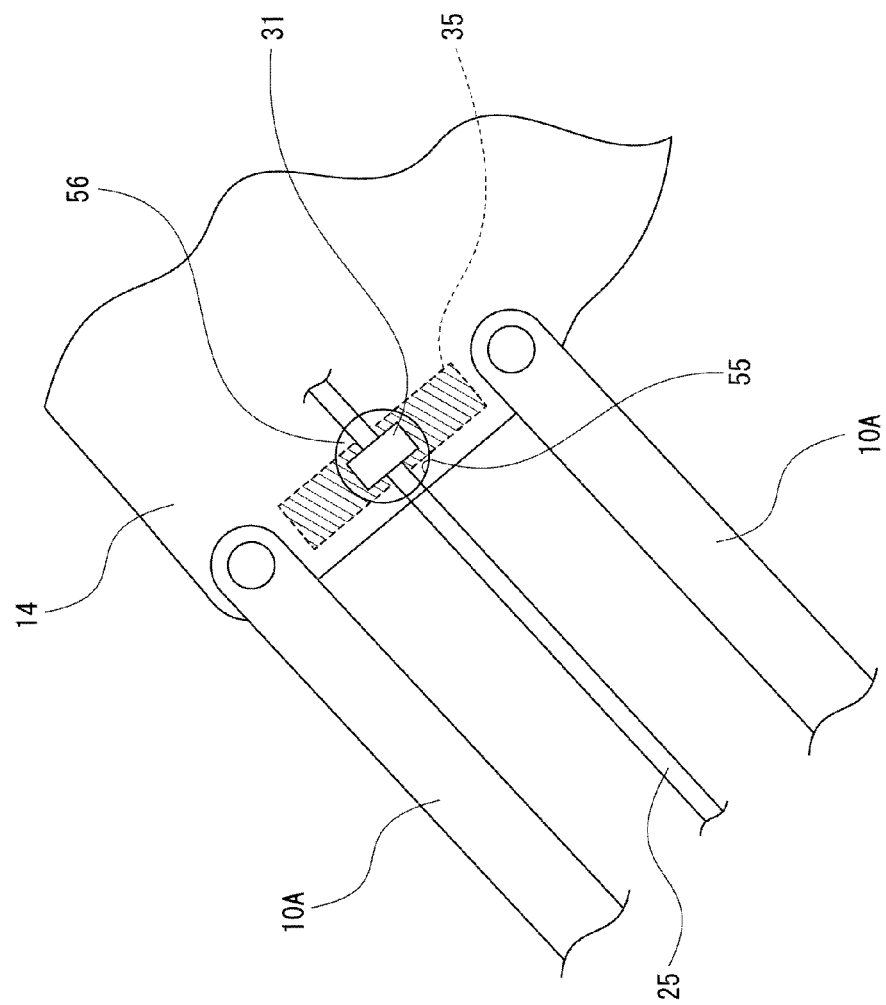
FIG. 12 is a schematic diagram depicting the rotational state of the first link portions with respect to the intermediate connecting member and the position and bending degree of the cable in another modification of the wiring supporter of FIG. 5, according to some embodiments.

As depicted in FIG. 12, in some embodiments, a circular attachment hole 55 may be formed in a central portion of the second region 35 in the arrangement surface 14a of the intermediate connecting member 14. A circular stage 56 is attached to the attachment hole 55 in such a manner as to be rotatable (turnable) with respect to the second region 35.

Figure 13:
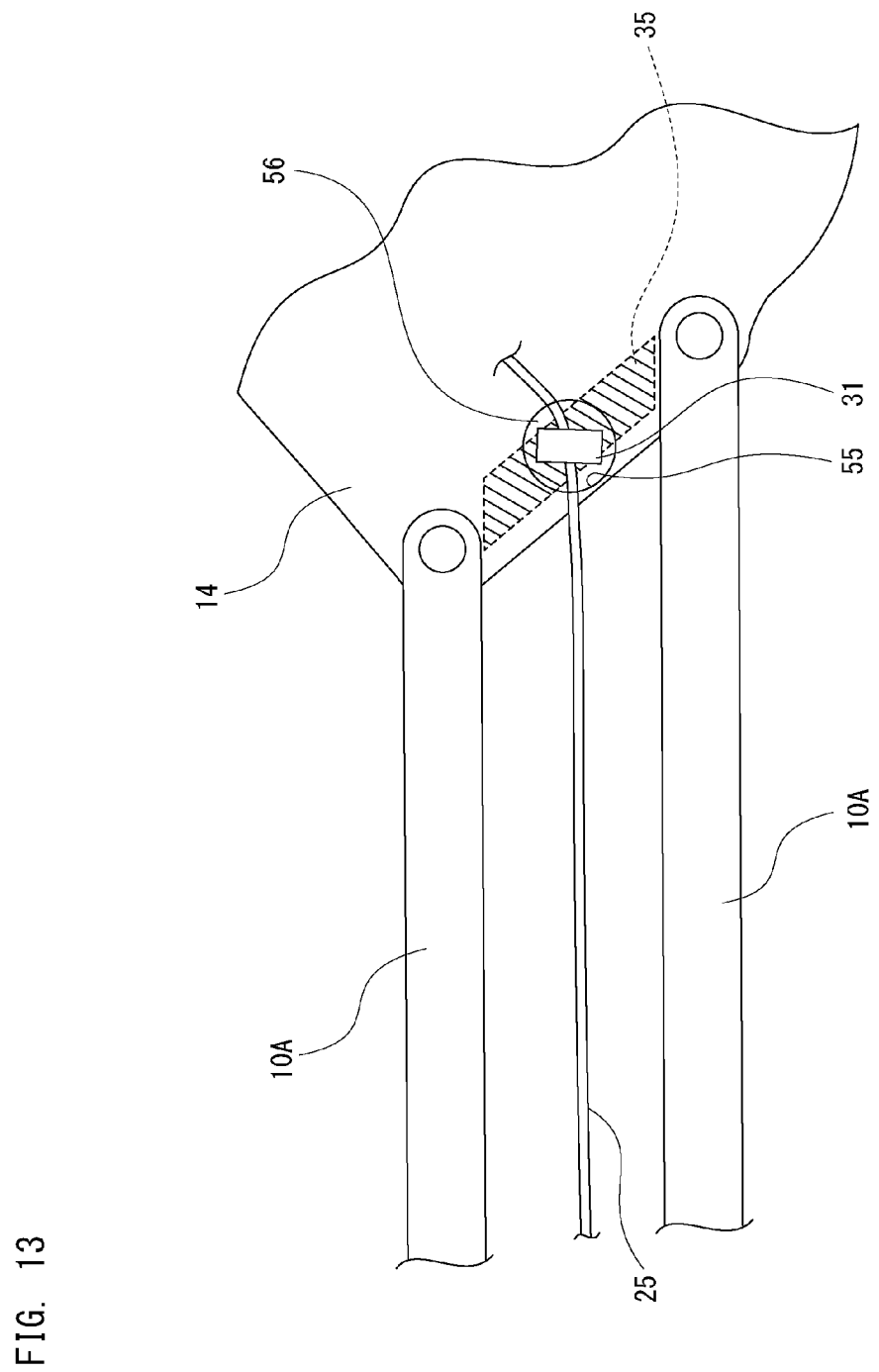
FIG. 13 is a schematic diagram depicting the position and bending degree of the cable in a case where the rotational state of the first link portions with respect to the intermediate connecting member is changed in the other modification of the wiring supporter of FIG. 5, according to some embodiments.

The first wiring supporter 31 is attached to the circular stage 56. The first wiring supporter 31 is attached in a state of being nonrotatable with respect to the circular stage 56. That is, as depicted in FIG. 12 and FIG. 13, the first wiring supporter 31 is rotatable with respect to the second region 35 according to rotation (turning) of the circular stage 56 with respect to the second region 35.

Because a part of the second region 35 is thus rotated together with the first wiring supporter 31, friction between the first wiring supporter 31 and the intermediate connecting member 14 is eliminated, and therefore, wear of the first wiring supporter 31 can be suppressed. Hence, it is possible to prevent damage to the first wiring supporter 31 and reduce the frequency of replacement of the first wiring supporter 31 and the frequency of inspection of parts.

A similar configuration can be applied also to the first region 34 and the proximal end side wiring supporter 30, the third region 36 and the second wiring supporter 32, and the fourth region 37 and the distal end side wiring supporter 33. Consequently, wear of each of the wiring supporters can be prevented.

Figure 14:
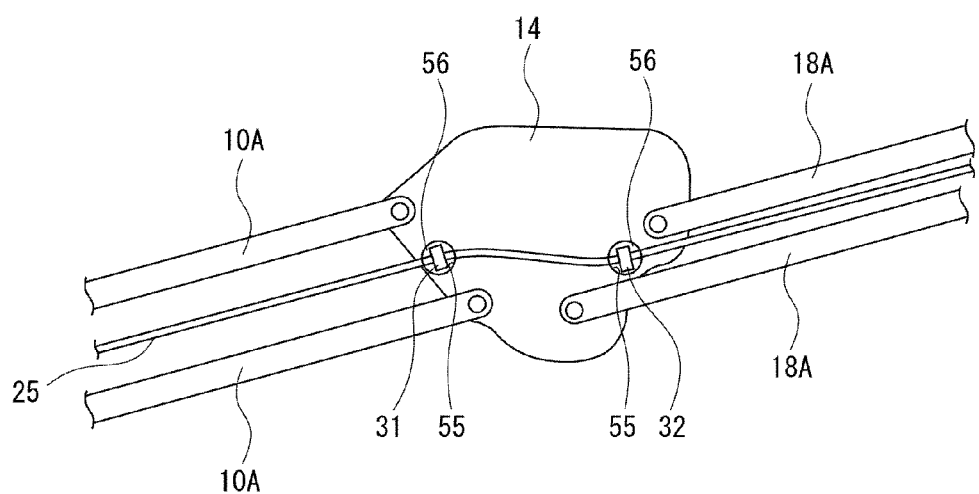
FIG. 14 is a schematic diagram depicting rotational states of the first link portions and second link portions with respect to the intermediate connecting member and the position and bending degree of the cable in the other modification of the wiring supporter of FIG. 5, according to some embodiments.
Figure 15:
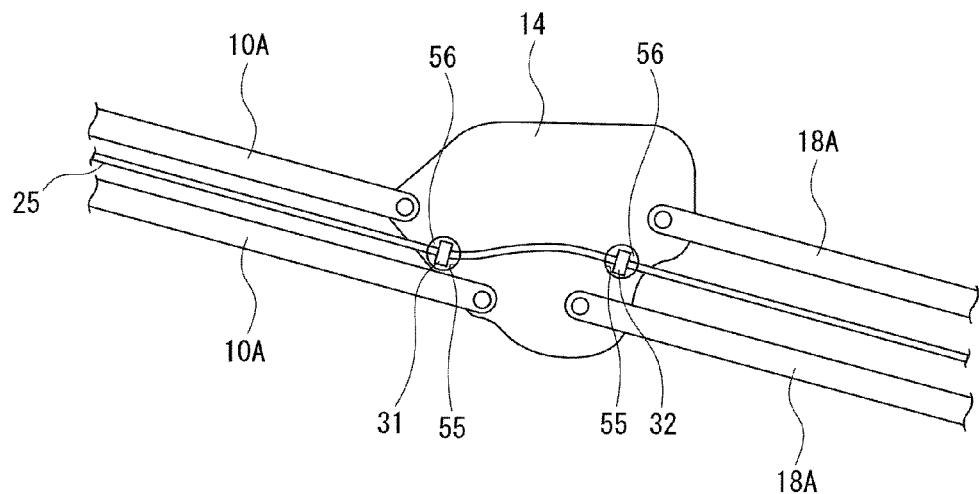
FIG. 15 is a schematic diagram depicting the position and bending degree of the cable in a case where the rotational states of the first link portions and the second link portions with respect to the intermediate connecting member are changed in the other modification of the wiring supporter of FIG. 5, according to some embodiments.

FIG. 14 and FIG. 15 depict a case where a similar configuration is applied to, for example, the second region 35 and the first wiring supporter 31 as well as the third region 36 and the second wiring supporter 32.

As depicted in the figures, even when the rotational states of the first link portions 10A and the second link portions 18A with respect to the intermediate connecting member 14 are changed, the application of an excessive load to the cable 25 routed along the first link portions 10A, the intermediate connecting member 14, and the second link portions 18A is prevented, and the bending radius of the cable 25 can be increased. Hence, the cable 25 can be protected.

<5. Others>

While description has been made of a case where one cable 25 is attached in each of the above-described examples, in some embodiments, a configuration may be applied to a cable group including a plurality of cables 25.

The attachment structure for the cable 25 in the surgical assistance device 1 described above can be applied to any device as long as the device includes a parallel link (first parallel link 9) including two link portions (first link portions 10A) parallel with each other and a member (intermediate connecting member 14) to which the link portions are attached.

The main body 4 including the first movable body 7, the second movable body 8, the intermediate connecting member 14, the third movable body 16, the fourth movable body 23, and the surgical instrument holder 24 described above functions as a surgical instrument holding device 57. The surgical instrument holding device 57 is a device that holds a surgical instrument such as forceps or an endoscope and that can freely change the position and pose of the surgical instrument by moving each movable body.

In the above-described examples, description has been made of the surgical assistance device 1 including one surgical instrument holding device 57. However, in some embodiments, in a case where two main bodies 4 are provided as surgical instrument holding devices 57, for example, a configuration may be adopted in which two second connecting arms 6 each made rotatable are provided to the first connecting arm 5, and first movable bodies 7 are connected to the respective second connecting arms 6.

In some embodiments, a plurality of second movable bodies 8 may be connected to one first movable body 7.

Thus providing a plurality of surgical instrument holding devices 57 makes it possible to perform a surgical operation by using a plurality of surgical instruments and consequently shorten a surgery time, and also makes it possible to perform an advanced surgical operation by using a plurality of surgical instruments of different kinds.

In some embodiments, even with such a configuration, the cable 25 (or the cable group) can be routed appropriately in each surgical instrument holding device 57.

As described in each of the foregoing examples, a surgical instrument holding device 57 may include a first parallel link 9 in which two first link portions 10A each having one end in an axial direction as a first end portion 13 are arranged in parallel with each other, a second parallel link 17 in which two second link portions 18A each having one end in an axial direction as a second end portion 20 are arranged in parallel with each other, a wiring member (cable 25) disposed along the first parallel link 9 and the second parallel link 17, and a connector (intermediate connecting member 14). The connector is provided with two first link supporters 15 by which the respective first end portions 13 are rotatably supported, two second link supporters 22 by which the respective second end portions 20 are rotatably supported, a first wiring supporter 31 configured to support the wiring member on a part between the two first link supporters 15, and a second wiring supporter 32 configured to support the wiring member on a part between the two second link supporters 22.

Consequently, a distance between the first wiring supporter 31 and the second wiring supporter 32 is not changed.

Hence, even when the first parallel link 9 and the second parallel link 17 are rotated, the cable 25 disposed along the intermediate connecting member 14 does not easily move greatly, and a large space for allowing movement of the cable 25 does not need to be secured. That is, it is possible to reduce the size and weight of the intermediate connecting member 14.

In some embodiments, the first wiring supporter 31 and the second wiring supporter 32 may support the wiring member (cable 25) in such a manner that the wiring member does not move in an axial direction of the wiring member.

Consequently, bending or the like of the cable 25 disposed along the intermediate connecting member 14 is prevented.

Hence, movement of the cable 25 is in some embodiments reduced, and the intermediate connecting member 14 can in some embodiments be reduced in size and weight.

In some embodiments, the wiring member may be supported by a part between end portions (proximal end side end portions 12) on a side opposite to the first end portions 13 in the two first link portions 10A and a part between end portions (distal end side end portions 21) on a side opposite to the second end portions 20 in the two second link portions 18A.

Consequently, a length of the cable 25 disposed along the first parallel link 9 and a length of the cable 25 disposed along the second parallel link 17 are not changed easily.

Hence, movement in the axial direction of the cable 25 due to movement of the first parallel link 9 and the second parallel link 17 is in some embodiments reduced, and a large escape space for allowing movement of the cable 25 does not need to be provided, so that the intermediate connecting member 14 can in some embodiments be reduced in size and weight.

In some embodiments, in particular, a part of the cable 25 which part is disposed along the first parallel link 9 is made parallel with the first link portions 10A and made to pass through a center between the two first end portions 13, and a part of the cable 25 which part is disposed along the second parallel link 17 is made parallel with the second link portions 18A and made to pass through a center between the two second end portions 20. Thus, the length of a part of the cable 25 which part is disposed along the first parallel link 9, the intermediate connecting member 14, and the second parallel link 17 is not changed, so that the movement of the cable 25 can in some embodiments be reduced.

In some embodiments, the wiring member (cable 25) may be supported by the first wiring supporter 31 in a state in which the wiring member is rotatable in an in-plane direction of an arrangement surface 14a on which the two first link supporters 15 are arranged in the connector (intermediate connecting member 14).

Consequently, even in the case of a cable 25 having a certain degree of hardness and high flexural rigidity, the length of a part of the cable 25 which part is disposed along the first parallel link 9 and the intermediate connecting member 14 is not greatly changed according to rotation of the first parallel link 9.

Hence, the intermediate connecting member 14 can be reduced in size and weight.

In some embodiments, the wiring member (cable 25) may be supported by the second wiring supporter 32 in a state in which the wiring member is rotatable in the in-plane direction of the arrangement surface 14a on which the two second link supporters 22 are arranged in the connector (intermediate connecting member 14).

Consequently, even in the case of a cable 25 having a certain degree of hardness and high flexural rigidity, the length of a part of the cable 25 which part is disposed along the intermediate connecting member 14 and the second parallel link 17 is not greatly changed according to rotation of the second parallel link 17.

Hence, the intermediate connecting member 14 can be reduced in size and weight.

In some embodiments, the first wiring supporter 31 may include a first supporting projecting portion (spherical projecting portion 42). A first rotary pedestal (supporting member 43) that has a fixing portion (fixing recessed portion 52) configured to fix the wiring member (cable 25) and a first insertion hole (through hole 50) into which the first supporting projecting portion is inserted, and that is rotatable with respect to the first supporting projecting portion, may be in some embodiments included.

Consequently, the supporting member 43 is rotated in such a manner as to slide on the arrangement surface 14a of the intermediate connecting member 14.

Hence, wear of the cable 25 is prevented, and damage to the cable 25 can be suppressed.

In some embodiments, the second wiring supporter 32 may include a second supporting projecting portion (spherical projecting portion 42). A second rotary pedestal (supporting member 43) that has a fixing portion (fixing recessed portion 52) configured to fix the wiring member (cable 25) and a second insertion hole (through hole 50) into which the second supporting projecting portion is inserted, and that is rotatable with respect to the second supporting projecting portion, may be in some embodiments included.

Consequently, the supporting member 43 is rotated in such a manner as to slide on the arrangement surface 14a of the intermediate connecting member 14.

Hence, wear of the cable 25 is prevented, and damage to the cable 25 can be suppressed.

A surgical assistance device 1 according to some embodiments may be a surgical assistance device 1 including a surgical instrument holding device 57 configured to hold a surgical instrument. The surgical instrument holding device 57 includes a first parallel link 9 in which two first link portions 10A each having one end in an axial direction as a first end portion 13 are arranged in parallel with each other, a second parallel link 17 in which two second link portions 18A each having one end in an axial direction as a second end portion 20 are arranged in parallel with each other, a wiring member (cable 25) disposed along the first parallel link 9 and the second parallel link 17, and a connector (intermediate connecting member 14). The connector may be provided with two first link supporters 15 by which the respective first end portions 13 are rotatably supported, two second link supporters 22 by which the respective second end portions 20 are rotatably supported, a first wiring supporter 31 configured to support the wiring member on a part between the two first link supporters 15, and a second wiring supporter 32 configured to support the wiring member on a part between the two second link supporters 22.

Because the surgical assistance device 1 includes such a surgical instrument holding device 57, the surgical assistance device 1 can provide the above-described various kinds of effects.

The surgical instrument holding device 57 and the surgical assistance device 1 have a configuration including a part corresponding to the above-described first parallel link 9, a part corresponding to the second parallel link 17, and the intermediate connecting member 14 connecting the two parallel links to each other. The surgical instrument holding device 57 and the surgical assistance device 1 can thus produce the above-described various kinds of actions and effects. That is, as for the other parts, the above-described configurations are mere examples, and the surgical instrument holding device 57 and the surgical assistance device 1 do not necessarily need to be configured as described above. For example, embodiments described herein can be implemented even in a case where the surgical instrument holding device 57 and the surgical assistance device 1 do not include the configuration of a part of the above-described parts or in a case where the surgical instrument holding device 57 and the surgical assistance device 1 include a different configuration.

For example, the first connecting arm 5 and the second connecting arm 6 may not be rotatable with respect to each other. In some embodiments, the second connecting arm 6 may be configured to be extensible and contractible with respect to the first connecting arm 5. Similarly, the first connecting arm 5 may be configured to be extensible and contractible with respect to the pole 3. Needless to say, the first connecting arm 5 and the second connecting arm 6 may be rendered extensible and contractible while rotatable with respect to each other.

In some embodiments, the base 2 may be fixed to a floor or the like, or may be configured to be movable on the floor. In some embodiments, the base 2 may be rendered movable and rendered fixable at any position.

Thus, as long as the first parallel link 9, the second parallel link 17, and the intermediate connecting member 14 are configured as described above, the other parts do not hinder the implementation even when configured in any manner.

It should be understood that the present disclosure is not limited to the above embodiments, but various other changes and modifications may be made therein without departing from the spirit and scope of the appended claims.

The invention claimed is:

1. A surgical instrument holding device comprising:
   a first parallel link in which two first link portions each having one end in an axial direction as a first end portion are arranged in parallel with each other;
   a second parallel link in which two second link portions each having one end in an axial direction as a second end portion are arranged in parallel with each other;
   a wiring member disposed along the first parallel link and the second parallel link; and
   a connector provided with:
      two first link supporters by which the respective first end portions are rotatably supported,
      two second link supporters by which the respective second end portions are rotatably supported,
      a first wiring supporter configured to support the wiring member between the two first link supporters, and
      a second wiring supporter configured to support the wiring member between the two second link supporters.

2. The surgical instrument holding device according to claim 1, wherein:
   the first wiring supporter and the second wiring supporter support the wiring member in such a manner that the wiring member does not move in an axial direction of the wiring member.

3. The surgical instrument holding device according to claim 1, wherein:

the wiring member is supported by a third wiring supporter between proximal end portions on a side of the two first link portions that is opposite from the first end portions and a fourth wiring supporter between distal end portions on a side of the two second link portions that is opposite from the second end portions.

4. The surgical instrument holding device according to claim 1, wherein:
the wiring member is supported by the first wiring supporter in a state in which the wiring member is rotatable in an in-plane direction of an arrangement surface on which the two first link supporters are arranged in the connector.

5. The surgical instrument holding device according to claim 4, wherein:
the two second link supporters are arranged on the arrangement surface, and the wiring member is supported by the second wiring supporter in a state in which the wiring member is rotatable in the in-plane direction of the arrangement surface.

6. The surgical instrument holding device according to claim 5, wherein:
the first wiring supporter includes a first supporting projecting portion, and
the surgical instrument holding device comprises a first pedestal that has a first fixing portion configured to fix the wiring member and a first insertion hole into which the first supporting projecting portion is inserted, the first pedestal being rotatable with respect to the first supporting projecting portion.

7. The surgical instrument holding device according to claim 6, wherein:
the second wiring supporter includes a second supporting projecting portion, and
the surgical instrument holding device comprises a second pedestal that has a second fixing portion configured to fix the wiring member and a second insertion hole into which the second supporting projecting portion is inserted, the second pedestal being rotatable with respect to the second supporting projecting portion.

8. The surgical instrument holding device according to claim 4, wherein:
the first wiring supporter includes a first supporting projecting portion, and
the surgical instrument holding device comprises a first pedestal that has a fixing portion configured to fix the wiring member and a first insertion hole into which the first supporting projecting portion is inserted, the first pedestal being rotatable with respect to the first supporting projecting portion.

9. The surgical instrument holding device according to claim 1, wherein:
the wiring member is supported by the second wiring supporter in a state in which the wiring member is rotatable in an in-plane direction of an arrangement surface on which the two second link supporters are arranged in the connector.

10. The surgical instrument holding device according to claim 6, wherein:
the second wiring supporter includes a second supporting projecting portion, and
the surgical instrument holding device comprises a second pedestal that has a fixing portion configured to fix the wiring member and a second insertion hole into which the second supporting projecting portion is inserted, the second pedestal being rotatable with respect to the second supporting projecting portion.

11. A surgical assistance device comprising:
the surgical instrument holding device according to claim 1, the surgical instrument holding device being configured to hold a surgical instrument at a distal end thereof.

12. The surgical assistance device according to claim 11, comprising:
a base;
a pole connected to the base,
wherein the surgical instrument holding device is rotatably connected to the pole.

13. A surgical instrument holding device comprising:
a first parallel link comprising two first link portions arranged in parallel with each other;
a second parallel link comprising two second link portions arranged in parallel with each other;
a connector comprising:
two first link supporters rotatably connected to each of the two first link portions, respectively;
two second link supporters rotatably connected to each of the two second link portions, respectively;
a first wiring supporter provided between the two first link supporters, and
a second wiring supporter provided between the two second link supporters; and
a wire disposed between the two first link portions and between the two second link portions, the wire being supported by the first wiring supporter and the second wiring supporter.

14. The surgical instrument holding device according to claim 13, wherein:
the first wiring supporter and the second wiring supporter support the wire such that the wire does not move in an axial direction of the wire.

15. The surgical instrument holding device according to claim 13, wherein:
the connector comprises a surface on which the two first link supporters are arranged, and
the wire is supported by the first wiring supporter such that the wire is rotatable in a plane parallel to a plane of the surface of the connector.

16. The surgical instrument holding device according to claim 15, wherein the two second link supporters are arranged on the surface, and
the wire is supported by the second wiring supporter such that the wire is rotatable in the plane parallel to the plane of the surface of the connector.

17. The surgical instrument holding device according to claim 16, wherein:
the first wiring supporter includes a first supporting projecting portion, and
the surgical instrument holding device comprises a first pedestal to which the wire is attached and a first insertion hole into which the first supporting projecting portion is inserted, the first pedestal being rotatable with respect to the first supporting projecting portion.

18. The surgical instrument holding device according to claim 17, wherein:
the second wiring supporter includes a second supporting projecting portion, and
the surgical instrument holding device comprises a second pedestal to which the wire is attached and a second insertion hole into which the second supporting projecting portion is inserted, the second pedestal being rotatable with respect to the second supporting projecting portion.

19. The surgical instrument holding device according to claim 13, wherein the wire is supported at a midpoint of the first wiring supporter and at a midpoint of the second wiring supporter.

20. The surgical instrument holding device according to claim 13, further comprising:
   two third link supporters provided at ends of the two first link portions opposite from the two first link supporters, respectively,
   a third wiring supporter provided between the two third link supporters,
   wherein the wire is supported by the third wiring supporter, and
   wherein a length of the wire from the first wiring supporter to the third wiring supporter is a same length as a length of each of the two first link portions.

* * * * *